J. T. HUME.
CONVEYER ATTACHMENT FOR BAND CUTTERS AND FEEDERS.
APPLICATION FILED OCT. 25, 1907.
1,199,986.
Patented Oct. 3, 1916.
4 SHEETS—SHEET 4.
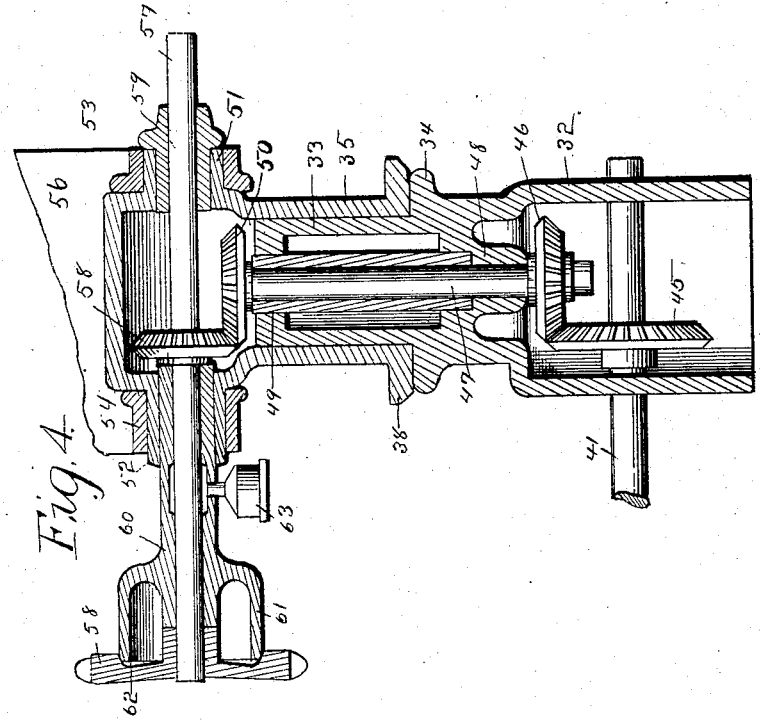
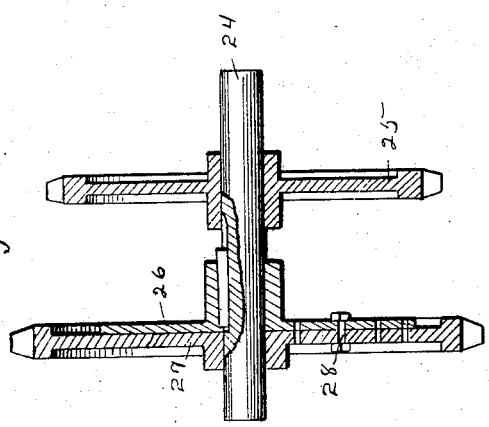
Witnesses
A. G. Hague
F. C. Dahlberg
Inventor
J T Hume
by Onng & Lane Attys

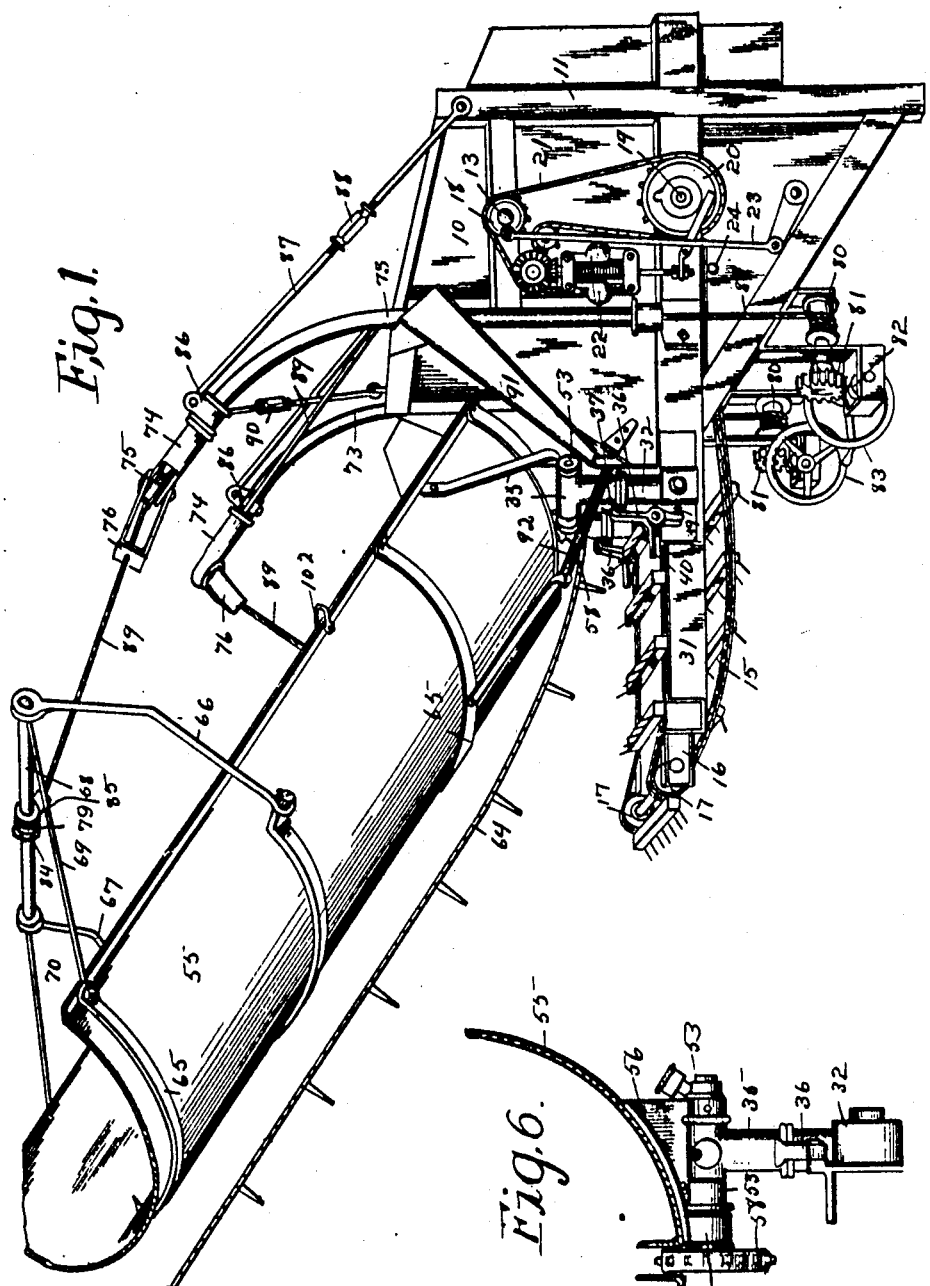

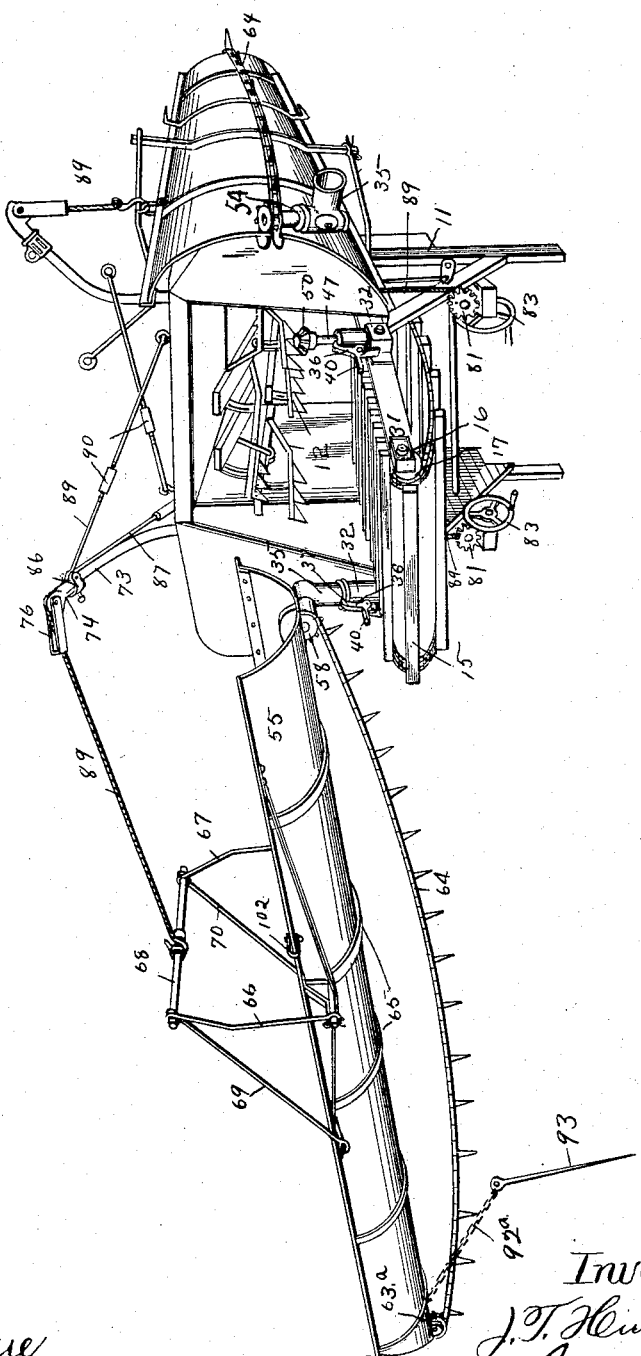

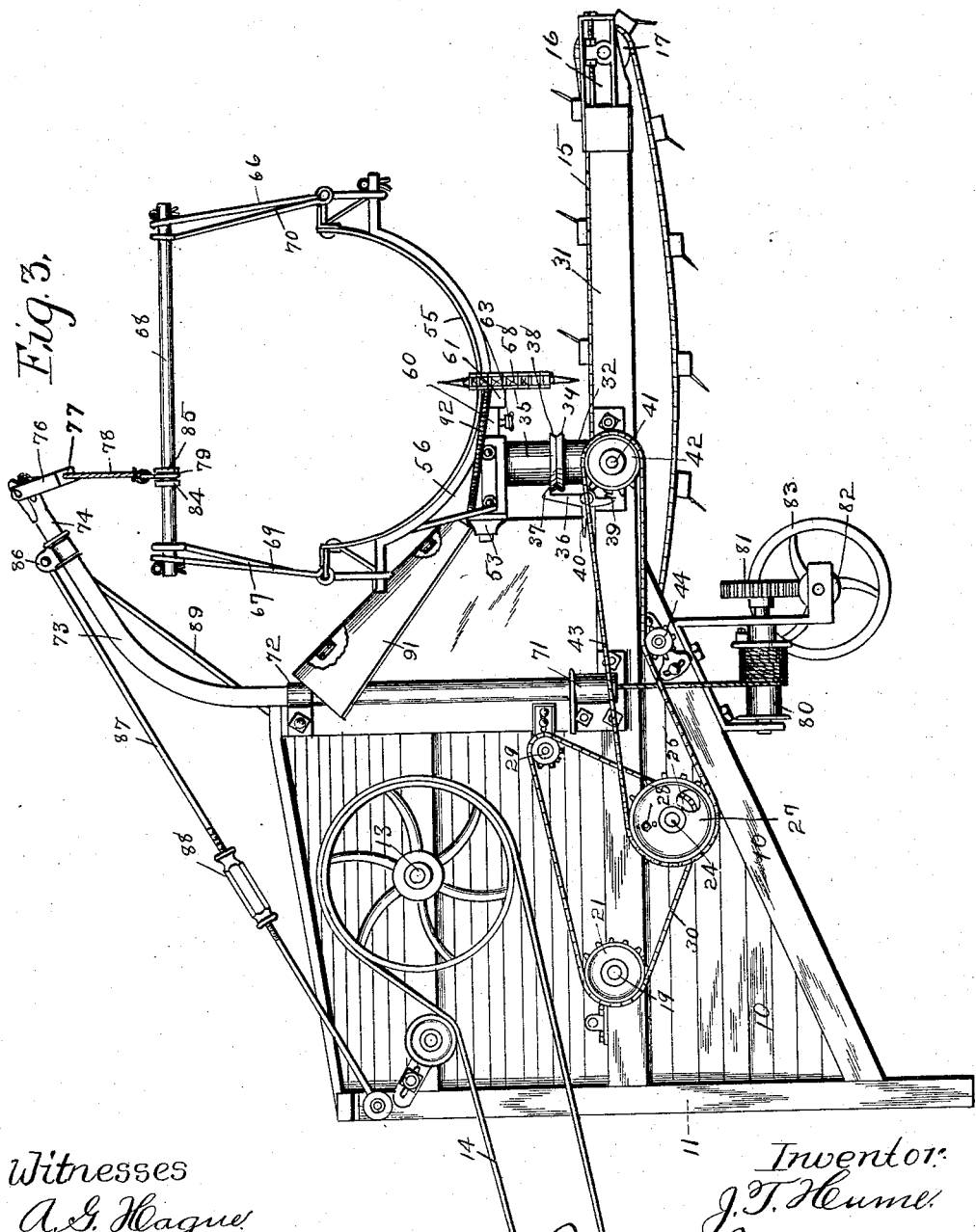

UNITED STATES PATENT OFFICE.

JOHN T. HUME, OF NEWTON, IOWA.

CONVEYER ATTACHMENT FOR BAND-CUTTERS AND FEEDERS.

1,199,986. Specification of Letters Patent. Patented Oct. 3, 1916.

Application filed October 25, 1907. Serial No. 399,114.

*To all whom it may concern:*

Be it known that I, JOHN T. HUME, a citizen of the United States, residing at Newton, in the county of Jasper and State of Iowa, have invented a certain new and useful Conveyer Attachment for Band-Cutters and Feeders, of which the following is a specification.

My invention relates to adjustable swinging carriers designed to form a portion of a band cutter and feeder, which may be readily attached to or detached from any of the ordinary makes of threshing machines now in use, and it consists of a novel form of band cutter frame, conveyer and knives which are to be used in conjunction with adjustable and detachable swinging conveyers.

The objects of the invention are to provide a band cutter and feeder frame with the necessary knives and conveyer which may be easily attached to or detached from the frame of the threshing machine, and to provide a certain form of swinging conveyers for feeding straw or other material into the conveyer within the frame with a minimum amount of work on the part of the operator, and further to provide swinging conveyers which are driven from the main driving shaft of the band cutter and feeder frame, and which are so constructed that they may be readily disconnected from or attached to the main frame, and when attached, be capable of swinging laterally and of being swung upwardly and downwardly at their outer ends, and further to enable the operator to easily swing the swinging conveyers to a folded position at the sides of the band cutter frame and maintain them in this position, so that the device can be easily transported from one place to another either when the frame of the band cutter and feeder is attached to the frame of the threshing machine, or is separate and apart from it.

The various mechanisms by which the parts of the device are operated are very advantageous in use, and afford easy and quick adjustment on all of the movable parts.

My invention consists in certain details in the construction, arrangement and combination of the various parts of the device, whereby the objects contemplated are attained, as hereinafter more fully set forth, pointed out in my claims and illustrated in the accompanying drawings, in which—

Figure 1 is a side elevation of the device with a portion of one of the swinging conveyers cut away in order to show the rest of the device more clearly. Fig. 2 is a perspective view of the device with one of the swinging conveyers in readiness for operation, and the other folded against the side of the frame of the band cutter and feeder. Fig. 3 is an elevation of the opposite side of the device from that shown in Fig. 1. Fig. 4 is a vertical, sectional view of one of the supporting mechanisms for the swinging conveyers, showing in detail the driving parts mounted therein. Fig. 5 is a detail, sectional view of one of the shafts and the sprockets which form a portion of the driving mechanism of the auxiliary conveyer, showing the way in which these gears are operatively connected with each other, and the mechanism for automatically stopping the operation of the auxiliary conveyers when this becomes clogged. Fig. 6 is a detail view of the auxiliary conveyer supporting mechanism, showing the curved support in elevation, to which the inner ends of the conveyers are secured, and by which the inner ends of these conveyers are supported. This view shows a portion of one of the auxiliary conveyers in section.

Referring to the accompanying drawings, I have used the reference numeral 10 to indicate the frame of the band cutter and feeder, which may be easily attached to or detached from the ordinary frame of a threshing machine by securing the forward posts 11 thereto. Mounted between the sides of the frame 10 are the band cutter knives and their supports 12, which are the form commonly in use at the present time. These band cutter knives are driven in the ordinary way from the driving shaft 13, which, in turn, is driven by means of the belt 14 from the engine. Secured to and extending rearwardly from the frame 10 is a short conveyer 15, designed to receive bundles of straw and advance them beneath the band cutter knives in such a way that these knives will sever the bands from the bundles of grain and allow the straw to be advanced to the cylinder of a threshing machine. Sliding plates 16 are provided at the rear of the band cutter frame, designed to support the shaft at the rear end of the conveyer, for adjusting the position of the sprockets 17, mounted on it, over which the conveyer runs. Mounted on the opposite end of the driving shaft from the driving wheel, which is driven by the belt 14, is a sprocket 18. Extending transversely of the frame beneath the driving shaft 13 is a shaft 19, which has mounted on one end of it a sprocket 20. On the other end of the shaft 19 is a sprocket 21. Passing around the sprockets 18 and 20 is a sprocket chain 21, operatively connected with the ordinary ball governor 22 which controls the speed of the various parts of the device.

A mechanism 23, which operates the ordinary feeding pans, not shown in the drawings, but prevalent in nearly all of the band cutters now in use, is connected with the sprocket wheel 18, but forms no particular part of my invention.

Extending transversely of the frame of the band cutter and in front of the shaft 19, is a shaft 24 which has rigidly mounted near one end of it a sprocket 25. Keyed to the shaft 24, immediately outside of the sprocket 25, is a disk 26 which is locked to the sprocket 27 immediately outside of it on the shaft 24, by means of the bolt 28, the purpose of the bolt being when too great a strain is exerted upon the sprocket 27 in the driving operation of it, to be hereinafter described, the bolt 28 is cut off by the disk 26 and the interior of the sprocket 27, and thus obviates any danger of breaking other parts of the device which are hard to replace. There is an idler sprocket 29 on the same side of the frame as the sprockets 21 and 25. Passing around the sprockets 21, 25 and 29 is a sprocket chain 30, so arranged that as the driving shaft is operated, the shaft 25, and with it the disk 26 and sprocket 27 will be operated. It is from the sprocket 27 that the auxiliary conveyers of my device are operated in a manner hereinafter set out, and it is from the shaft 24 that the conveyer 15 is driven.

Secured to the same side of the frame 31 which supports the conveyer 15 as the sprocket 27, is a boxing 32 having a bearing 33 at its upper end, and having an annular support 34 encircling it at approximately its vertical center. Mounted on the bearing 33 and having its lower portion engage the annular support 34 is a gear casing 35, so arranged that it can be swung readily on the annular support 34.

I have provided a locking device 36 which is pivoted to the boxing 32, and which has the catch 37 at its upper end engaging the annular rim 38 of the gear casing 35 for normally holding this gear casing in position relative to the annular support 34. This locking device has a spring 39 which normally holds it in a locked position. There is an operating lever 40 to this locking device by which it may be operated by the resistance of the spring 39.

Extending transversely of the frame 31 is the driving shaft 41 for operating the auxiliary conveyer. Mounted on the shaft 41 immediately outside of the boxing 32 is a sprocket 42 driven from the sprocket 27 by a sprocket chain 43. The sprocket chain 43 is tightened and properly adjusted by means of the adjustable sprocket idler 44. I have mounted a bevel gear 45 on that portion of the shaft 41 which is inside of the boxing 32. In mesh with the bevel gear 45 is a bevel gear 46 inside of the boxing 32, and mounted on the shaft 47 which is rotatably mounted in bearings 48 and 49, supported from the boxing 32. Mounted on the upper end of the shaft 47 is a bevel gear 50. Extending outwardly from the upper end of each side of the gear casing 35 are the trunnions 51 and 52, upon which trunnions the conveyer supporting bearings 53 and 54 are mounted. These bearings 53 and 54 are secured to the trough 55 of one of the auxiliary conveyers by means of a curved conveyer support 56, (shown clearly in Fig. 6 of the drawings) which is bolted to this conveyer.

Extending longitudinally of the upper portion of the gear casing 35 is a conveyer driving shaft 57, having mounted on that portion of it which is within the gear casing 35, a bevel gear 50. The bearings 59 and 60 extend outside of the trunnions 51 and 52 somewhat, to rigidly hold this shaft 57 in its proper position. On the outer end of the shaft 57 is a sprocket 58 which drives the chain of the auxiliary conveyer, hereinafter set out. I have provided a protector 61 mounted on the bearings 60 designed to enter a channel 62 in the sprocket wheel 58 to prevent straw and other substances from winding around the bearing 60 and the sprocket wheel 58, and prevent clogging of the parts. I have provided an oil cup 63, shown clearly in Fig. 4 of the drawings, for properly oiling the parts of the device.

It will be seen by an examination of the above construction that when it is desired to move the gear casing, and with it the shaft 57 and the parts mounted thereon, this can be readily done by simply throwing the hooked portion 39 of the locking mechanism 36 out of engagement with the shoulder 88 on this gear casing, for when the gear casing is lifted off, the bevel gears will readily separate, and when it is desired to place the gear casing 35 upon its bearing, this can be easily done by slipping it over the bearing 33, the bevel gears 50 and 58 readily coming into mesh with each other.

The auxiliary conveying mechanism which is supported by the gear casing 35, in the manner above described, comprises the through trough 55 substantially semicircular in cross section at the inner end, and near the central portion of which the sprocket 58 is mounted, as shown in Fig. 3. Near the outer end of this conveyer there is a sprocket 63ᵃ.

Passing around the sprockets 58 and 63ᵃ is a toothed sprocket chain 64 designed to be so operated through the mechanism above described from the driving shaft of the machine, that it will advance bundles of grain thrown within the trough to the inner end of said conveyer, and deliver them upon the conveyer 15. The shape of the trough 55 of the conveyer constantly causes the bundles of grain to be forced to the central portion of it in which the toothed sprocket chain 64 is mounted, so that these bundles will be readily engaged by the toothed sprocket chain and advanced by it to a point of delivery. The shape of this conveyer tends to draw the bundles of grain, which are thrown into the auxiliary conveyer with the grain bearing portions toward the band cutter frame, into a longitudinal position relative to the auxiliary conveyers, so that when these bundles are delivered from the auxiliary conveyer to the main conveyer 15, the grain bearing portion of the bundles striking the main conveyer first, tends to draw this end in first and delivers the bundles beneath the band cutter knives longitudinally of these knives, so that the bands can be readily severed and the grain delivered to the threshing machine in the proper condition.

The trough 55 is braced by a series of braces 65. Pivotally attached to each side of the trough 55 are two supporting arms 66 and 67 which are connected at their upper ends by means of a cross bar 68. Pivotally attached to the cross bar 68 and hooked to the trough 55 some little distance in front of the pivotal points of the arms 66 and 67 are the brace rods 69 and 70. The above construction is provided, so as to enable the operator to easily fold down the supporting frame-work formed by these members when it is desired to remove this auxiliary conveyer and place it at the side of the main conveyer for transportation or otherwise.

Owing to the fact that the gear casing 35 swings upon its bearing 33, and to the fact that the conveyer support 56 is pivotally mounted on the trunnions 51 and 52, the auxiliary conveyer has an oscillating movement, and is capable of being swung upwardly and downwardly upon its pivotal attachment to the gear casing.

Rotatably mounted in the bearings 71 and 72, which are secured to the side of the frame 10 of the band cutter and feeder, is a curved supporting arm 73, which preferably has an opening extending longitudinally through it. Rotatably mounted near the outer end of the supporting arm 73 is a pulley bearing sleeve 74, having the pulley 75 rotatably mounted at its outer end. Pivotally attached to the outer end of the pulley bearing sleeve 74 is a yoke 76, having an opening 77 extending through its free end. I have provided a rope 78 having the hook 79 at its outer end which is hooked over the cross bar 68 on the auxiliary conveyer which passes through the openings 78, over the pulley 75 through the sleeve 74, and the supporting arm 73, to a drum 80 which is rotatably mounted beneath the frame 10 of the band cutter. This drum is driven by a gear 81 secured to it, which is in mesh with a worm gear 82 operated through the ordinary hand wheel 83.

I have provided two collars 84 and 85 on the cross bar 68, which hold the hook 79 against longitudinal movement on the shaft 68.

It will be seen that when the rope is attached to the cross bar 68, above described, the outer end of the conveyer will be supported in any desired position by the gearing construction, the rope and the other supporting mechanisms. When it is desired to raise or lower the outer end of the auxiliary conveyer, this can be easily done, and when the position of the auxiliary conveyer is determined by the operator, this position will be maintained by the mechanism described, constantly. It will also be seen that this construction enables the auxiliary conveyer to be swung horizontally.

I have provided a brace for the supporting arm 73, comprising a fixed collar 86 which is secured near the upper end of this supporting arm 73 secured to this brace at one end, and to the band cutter frame 10 at its other end is an adjustable and detachable brace rod 87, which has the turn buckle 88 in it, so that the upper and lower parts of it may be adjusted relative to each other and afford the removal of this brace to allow the arm 73 to swing within the bearings 71 and 72 when it is desired to swing the auxiliary conveyer to a position adjacent to the side of the frame. I have also provided another brace 89 which is secured to the rear end of the frame, and to the collar 86 which supports the arm 73 against lateral strain. There is a turn buckle 90 in this brace 89 also, which allows it to be adjusted longitudinally and enables the brace 89 to be removed in order to enable the supporting arm 73 to be swung in its bearings 71 and 72 when folding the auxiliary conveyer against the side of the frame of the band cutter for transportation. The purposes of these braces 87 and 89 is to maintain the supporting arms 73 rigidly in position while the auxiliary conveyer is in field operation and yet to enable the operator to readily disengage these braces for folding the auxiliary conveyer against the band cutter frame.

Secured to the side of the band cutter frame 10 is a swinging fender 91 which is held in engagement with the inner side of the auxiliary conveyer 55 by means of the spring 92, and is held to serve as a guide for preventing any of the grain from being delivered at the side of the delivery end of the auxiliary conveyer while it is being dropped upon the main conveyer 15. In the outer end of the auxiliary conveyer I have secured, by a short chain 92ª the stake 93, designed to be driven into the stack from which the auxiliary conveyer is being supplied with bundles of grain to prevent the oscillation of this conveyer during the operation of it.

On the opposite end of the shaft 41 from that upon which the auxiliary conveyer, above described, is mounted, I have provided a conveyer supporting mechanism, comprising a boxing similar to the boxing 32, a gear casing similar to the gear casing 35, bevel gears and shafts similar to those mounted in these parts, and a conveyer mechanism with a trough similar to the trough 55, and a toothed chain similar to the toothed chain 64, and a supporting and swinging mechanism similar in all respect to that of the swinging conveyer already described, and operated in the same way, except that it operates on the opposite side of the machine, and for these reasons I do not make a detail description of the parts, except to say that the toothed sprocket chain is driven from the opposite end of the shaft 41 from that by which the described conveyer is driven, through mechanisms identical to those described in the auxiliary conveyer which I have fully pointed out.

In operation and assuming that the auxiliary conveyers of the device are in the operative position in relation to the main conveyer 15, and that these auxiliary conveyers are swung to their proper positions above the stack, from which the bundles of grain are to be taken, the operator standing upon the stack throws the bundles onto the rear ends of these auxiliary conveyers, and the bundles are advanced by them to a point of delivery onto the main conveyer. When the stack has been lowered somewhat by the feeding of the auxiliary conveyers, these conveyers are lowered to proper position, or swung to another position on the stack, and the operation of feeding continues. When it is desired to move the band cutter, together with the threshing machine, to which it is attached, from place to place, or in shipment, the hook 79 is released from its engagement with the shaft 68, and hooked into the eyes 102 which are on each of the auxiliary conveyers, and the gear casing 35 is then lifted off of the bearing 33 and the entire conveyer, together with the gear casing, is swung into the folded position in which one of the conveyers is shown in Fig. 2 of the drawings; that is, to a position at the side of the frame of the band cutter. When both of the conveyers are in this position, the band cutter is in readiness for transportation from one place to another.

Having thus described my invention, what I claim and desire to secure by Letters Patent of the United States, therefor is—

1. In an attachment for band cutters, the combination with a conveyer of a support, a vertical hollow bearing stud having shoulders carried thereby, a hollow casing carried by the rear end of the conveyer and at one side thereof having a horizontal and a vertical tubular extension, said vertical extension being adapted to fit over and rest upon the shoulders of said bearing stud whereby said conveyer is capable of being folded back in a horizontal plane and against said support, said casing being readily removable from said bearing stud to disconnect said conveyer from the support and means journaled in said casing and said bearing stud for operatively connecting said conveyer to driving mechanism for the purpose specified.

2. The combination of a support, a bearing stud permanently mounted thereupon, a shaft vertically mounted in said bearing stud and having a gear at its top, a gear casing rotatably mounted upon said bearing stud, a pair of laterally extending trunnions carried by said gear casing, a conveyer, a shaft carried by said conveyer and having bearings mounted in said trunnions, and a gear on said second mentioned shaft meshing with the gear on the vertical shaft, substantially as described.

JOHN T. HUME.

Witnesses:
S. F. CHRISTY,
F. C. DAHLBERG.

Copies of this patent may be obtained for five cents each, by addressing the "Commissioner of Patents, Washington, D. C."